(12) United States Patent
Kuehm et al.

(10) Patent No.: US 10,579,576 B2
(45) Date of Patent: Mar. 3, 2020

(54) METHOD AND APPARATUS FOR FORWARDING DATA

(71) Applicant: Carl Zeiss Microscopy GmbH, Jena (DE)

(72) Inventors: Andreas Kuehm, Dornburg-Camburg (DE); Nico Presser, Jena (DE); Hardy Thomas Koebe, Jena (DE); Joerg Engel, Weida (DE)

(73) Assignee: Carl Zeiss Microscopy GmbH, Jena (DE)

( * ) Notice: Subject to any disclaimer, the term of this patent is extended or adjusted under 35 U.S.C. 154(b) by 156 days.

(21) Appl. No.: 15/529,890

(22) PCT Filed: Nov. 24, 2015

(86) PCT No.: PCT/EP2015/077509
§ 371 (c)(1),
(2) Date: Nov. 7, 2017

(87) PCT Pub. No.: WO2016/083378
PCT Pub. Date: Jun. 2, 2016

(65) Prior Publication Data
US 2019/0347235 A1    Nov. 14, 2019

(30) Foreign Application Priority Data
Nov. 27, 2014   (DE) .......................... 10 2014 117 381

(51) Int. Cl.
*G06F 13/42* (2006.01)
*G06F 3/06* (2006.01)

(52) U.S. Cl.
CPC .............. *G06F 13/42* (2013.01); *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| 7,586,925 B2 | 9/2009 | Smith et al. |
| 2001/0015411 A1 * | 8/2001 | Ohdaira ............... G02B 21/002 250/458.1 |

(Continued)

FOREIGN PATENT DOCUMENTS

| DE | 10 2008 009 634 A1 | 8/2009 |
| DE | 10 2009 040 839 A1 | 4/2010 |

(Continued)

*Primary Examiner* — Henry Tsai
*Assistant Examiner* — Aurangzeb Hassan
(74) *Attorney, Agent, or Firm* — Murphy, Bilak & Homiller, PLLC (57) ABSTRACT

Forwarding devices and corresponding methods are provided in which a plurality of input data streams are distributed among a plurality of output data streams on the basis of synchronization marking. One example method of forwarding data includes receiving a plurality of input data streams, where at least some of the input data streams include synchronization markers indicating which data of the input data streams are to be output synchronously, in one or more common time segments. Further included in the method is distributing the data to be output synchronously among a plurality of output data streams on the basis of the synchronization markers. The distributing is carried out in such a way that data which, according to the synchronization markers, are to be transmitted in a common time segment are provided in the same time segment in all the output data streams to which the data are to be assigned.

13 Claims, 5 Drawing Sheets

(56) References Cited

U.S. PATENT DOCUMENTS

| | | | |
|---|---|---|---|
| 2005/0053028 A1* | 3/2005 | Smith | H04J 3/0685 370/321 |
| 2006/0200458 A1 | 9/2006 | Sankar | |
| 2007/0124725 A1 | 5/2007 | Wang et al. | |
| 2013/0333077 A1* | 12/2013 | Murdick | G01Q 30/025 850/9 |

FOREIGN PATENT DOCUMENTS

| | | |
|---|---|---|
| EP | 0588104 A2 | 3/1994 |
| JP | 2000278275 A | 10/2000 |
| JP | 2006135615 A | 5/2006 |
| JP | 2007505570 A | 3/2007 |
| JP | 2010154329 A | 7/2010 |

\* cited by examiner

METHOD AND APPARATUS FOR FORWARDING DATA

In many systems, data streams are generated by different components of a system, wherein each of said data streams may contain data for different receiver components. Such data streams may contain for example time-critical control data and/or control commands, wherein the forwarding to different receivers has to be carried out partly synchronously. One example of such systems is modern microscope systems in which data streams comprising control data or control commands are generated by different hardware components of the microscope system, and then have to be forwarded to different receiver components. A laser scanning microscope system may serve as an example, in which control commands are sent for example both to a scanner mirror for controlling a movement of the scanner mirror and to a respective image recording device, wherein the movement of the scanner mirror and the image recording are intended to be carried out synchronously with one another. Such control commands may moreover originate from different sources. This system serves only as an example, however, and corresponding requirements may also occur in other systems. Examples of such a microscope system and data streams are described in DE 10 2009 040839 A1 or DE 10 2008 009634 A1.

To put it generally, therefore, in some applications, data from n data sources, n≥1, have to be distributed among m data sinks, m≥1. Conventional pure software implementations are limited with regard to the data throughput by virtue of the required computation time (e.g. CPU capacity utilization) because a high resorting and synchronization complexity arises. In conventional solutions, this results in the necessity of keeping large data buffers available, wherein fast reactions to events are virtually impossible as a result of the large data buffers. In particular, by way of example, the data buffers result in a relatively long minimum latency until in particular external events can be detected and processed in such software. In conventional solutions in which the forwarding of data is bundled at a central location in software, problems may furthermore arise during the synchronization and prioritization of the individual data sources among one another. If such a conventional software solution is unable to attend to all sources during bundling and forwarding of the data in a timely manner, then it may happen that data outputs for outputting the output data streams lose their synchronism among one another, which in the extreme case renders the data unusable for certain applications and may ultimately lead to a defect of hardware used.

It is therefore an object of the present application to provide methods and apparatuses for distributing a plurality of input data streams among a plurality of output data streams which eliminate or at least alleviate the above-described problems or a portion thereof.

This object is achieved by means of a method as claimed and a forwarding device as claimed. The dependent claims define further exemplary embodiments and also a 10 microscope system comprising such a forwarding device.

In accordance with a first aspect, a method for forwarding data is provided, comprising:
providing a plurality of input data streams, wherein at least some of the input data streams comprise synchronization markers indicating which data of the input data streams are to be output in a common time segment, and
distributing data to be output synchronously of the input data streams among a plurality of output data streams on the basis of the synchronization markers.

In this case, the use of synchronization markers in the input data streams allows at least partly parallel processing and/or simple synchronization of the output data streams.

In this case, distributing may be carried out in such a way that data which are to be transmitted in a specific time segment are provided in an identical time segment in all the output data streams to which said data are to be assigned.

In this case, providing the input data streams may comprise storing the input data streams in a respectively assigned memory.

The method may comprise in particular progressively reading out the plurality of input data streams, wherein data assigned to a synchronization marker are read out in each case from each input data stream, and distributing the data thus read out among the output data streams.

The progressive reading out and the distributing may then be repeated in each case for a respective next synchronization marker of the input data streams, e.g. until all data present have been distributed among the output data streams.

In this case, the progressive reading out may be carried out in parallel for different groups of input data streams.

The method may additionally comprise filling time segments of the output data streams with data that are not to be transmitted synchronously.

In this case, the filling may be carried out in parallel for all the output data streams.

In this case, the filling may be carried out in such a way that data of the input data streams which are to be provided in a plurality of output data streams are provided in mutually corresponding time segments in the output data streams.

A data processing, e.g. the processes explained above, may be carried out at least partly in parallel for the plurality of output data streams, that is to say that dedicated processing devices that carry out e.g. the processes explained above may be provided for each output data stream. Other processes of the data processing may also be carried out by common processing devices for a plurality of output data streams.

In this case, the data may be data of a microscope system. The data may comprise commands, e.g. for controlling components of a system such as a microscope system. The commands may also comprise commands for synchronizing the input data streams and/or output data streams among one another and/or with external events.

The data of the input data streams may in each case have information regarding to which output data stream they are to be assigned.

In accordance with a second aspect, a forwarding device comprising a plurality of outputs is provided, wherein the forwarding device is configured to receive a plurality of input data streams, wherein at least some of the input data streams comprise synchronization markers which comprise data of the input data streams indicating which data of the input data streams are to be output in a common time segment, wherein the forwarding device is furthermore configured to provide a plurality of output data streams on the basis of the input data streams and the synchronization markers at the outputs (25-27).

The forwarding device may further comprise a plurality of memories, wherein each memory of the plurality of memories is configured for storing data of one of the input data streams. In other exemplary embodiments, a plurality of input data streams may also be stored in a common memory, or some or all of the input data streams may be divided among a plurality of memories. In addition, a plurality of memories may also be implemented as different areas in one memory.

The forwarding device may further comprise a sequencer device which may be configured to progressively read out data assigned to a synchronization marker from the memories, wherein the forwarding device may furthermore comprise an output buffer for each of the output terminals, wherein the sequencer device is configured to write the read data to those output buffers to whose output terminals the data are to be assigned.

The forwarding device may additionally comprise a further sequencer device, which may be configured to read out data which are not to be transmitted synchronously from the memories and to write said data to further output buffers, wherein respectively one further output buffer is assigned to one of the outputs, wherein the forwarding device further comprises a combination device for each output, wherein each of the combination devices can be configured to combine data from the output buffer and the further output buffer which are assigned to a respective output to form an output data stream.

It is also possible to provide more than one sequencer device and/or more than one further sequencer device, which are then assigned in each case a portion of the memories.

The forwarding device may be implemented at least partly as hardware.

In this case, the hardware may comprise for example an application-specific integrated circuit (ASIC) or a field programmable gate array (FPGA).

A further acceleration can be achieved by means of such a hardware implementation.

The forwarding device may be configured for carrying out one of the methods described above.

In accordance with a third aspect, a microscope system comprising such a forwarding device is provided.

The invention is explained in greater detail below on the basis of exemplary embodiments with reference to the accompanying drawings, in which.

Various exemplary embodiments are explained in greater detail below with reference to the accompanying drawings. These exemplary embodiments serve merely for illustration and should not be interpreted as restrictive. In this regard, by way of example, a description of one exemplary embodiment with a plurality of features or elements should not be interpreted to the effect that all these features or elements are necessary for implementing the exemplary embodiment. Rather, other exemplary embodiments may have fewer features or elements, alternative features or elements and/or additional features or elements. Features or elements of different exemplary embodiments may be combined with one another, unless indicated otherwise.

Figure 1:
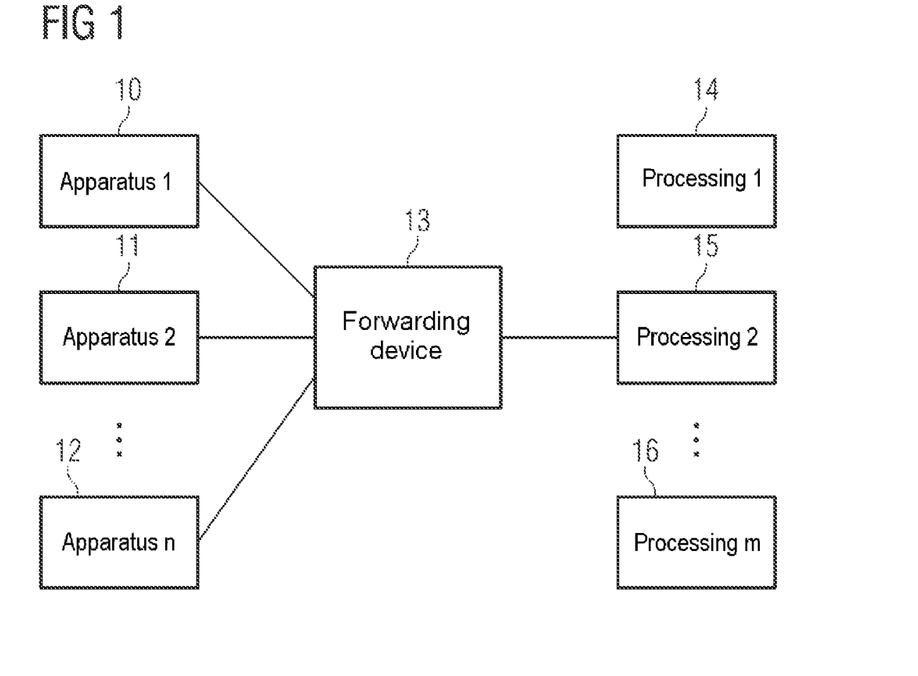
FIG. 1 shows a system comprising a forwarding device in accordance with one exemplary embodiment.

FIG. 1 illustrates a system comprising a forwarding device 13 in accordance with one exemplary embodiment. The forwarding device 13 receives input data streams from a plurality of apparatuses 10, 11, 12. While three apparatuses 10, 11, 12 are illustrated, generally an arbitrary number n of apparatuses 10-12, in particular n≥2, can be provided. Moreover, a plurality of data streams may emerge from a single apparatus. In this case, the apparatuses 10-12 may have hardware modules, software modules, or combinations thereof, in order to generate the input data streams.

The forwarding device 13 forwards data from the input data streams received from the apparatuses 10-12 to processing devices 14-16, wherein generally an arbitrary number m of processing devices 14-16 may be provided. m may be in particular 2, but is not restricted thereto. It is also possible for a plurality of output data streams to be forwarded to a single processing device, for example for different parts thereof. In this case, the term "processing device" indicates that the received data are processed further in some way, which may also include a further forwarding. By way of example, the data may also comprise control data which control the processing devices 14-16. Here data of the input data streams which are generated by the apparatuses 10-12 may be assigned in each case to one or a plurality of output data streams for the processing devices 14-16. Examples of these, too, will also be explained later. In some exemplary embodiments, the apparatuses 10-12 and also the processing devices 14-16 may be parts of a microscope system, for example of a laser scanner microscope system, as explained in the introduction.

As will be explained in greater detail later on the basis of examples, in exemplary embodiments input data streams which are output by the apparatuses 10-12 have synchronization markers. On the basis of these synchronization markers, the forwarding device 13 can generate the output data streams for forwarding to the processing devices 14-16 in such a way that the synchronism of data with respect to one another remains ensured. For this purpose, the forwarding device 13 may arrange in particular data assigned to mutually corresponding synchronization markers in a common time segment of the output data streams, for example a common clock cycle. In this case, the forwarding device 13 may be implemented wholly or partly in hardware, for example as a field programmable gate array (FPGA). However, the invention is not restricted thereto, and in other exemplary embodiments it is possible generally to use combinations of software, hardware and firmware in order to implement the forwarding device.

Figure 2:
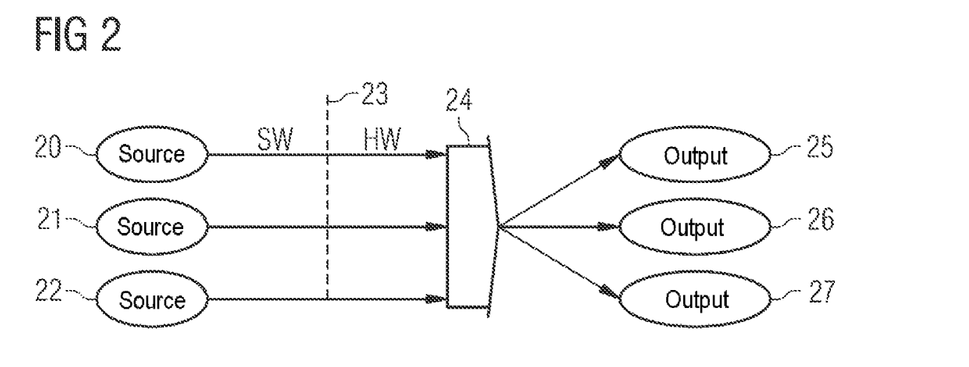
FIG. 2 shows a schematic illustration of a system in accordance with one exemplary embodiment.

FIG. 2 shows a system comprising a forwarding device 24 in accordance with a further exemplary embodiment. In the exemplary embodiment in FIG. 2, a plurality of input data streams is supplied by a plurality of data sources 20 to 22. The data sources 20 to 22 may correspond for example to the apparatuses 10-12 in FIG. 1 or to parts thereof, but are not limited thereto. The input data streams may initially be processed in software (SW) before, in the exemplary embodiment in FIG. 2, they are distributed in hardware (HW), for example by means of a distribution device 24 implemented as a field programmable gate array (FPGA) or an ASIC, among outputs 25 to 27. In this case, the outputs 25 to 27 may be in particular hardware outputs via which data are output for example to the processing devices 14-16 in FIG. 1.

The processing in hardware illustrated in FIG. 2 may output, in particular independently of software, a plurality of data streams from the sources 20 to 22 to the outputs 25 to 27 (data sinks) in a temporally synchronized manner and in a manner corresponding to a real-time-critical time regime. In this case, the data synchronization may be dependent on the data streams themselves, on external conditions themselves, on external conditions and/or on other temporal boundary conditions that occur in the system in FIG. 2. Such dependencies may comprise for example a necessity to output data up to specific periodic synchronization times, a necessity to output data with the shortest possible latency between such synchronization times or to insert data into output data streams, to achieve a low-latency reaction to external and/or internal events (triggers), to achieve a fast reaction to applicative conditions of a respective application, and/or to achieve a low-latency control and synchronization of the data, in particular of different input data streams among one another. In exemplary embodiments, it is furthermore ensured here that, with a low latency, it is possible to react to a plurality of events (for example to real-time-critical data without synchronization requirements, external conditions, internal markers in the data, clock changes of a clock signal etc.) whilst maintaining a synchronization, without intervention of software being required here. For this purpose, the input data streams generated by the sources 20 to 22, as already explained with reference to FIG. 1, may have synchronization markers, and the data streams may be classified in parallel for each individual data stream (for example on the basis of the synchronization markers, and/or a classification into data to be transmitted synchronously or asynchronous data). The classified data streams may then be processed downstream and distributed among the outputs 25 to 27.

While three data sources 20 to 22 and three outputs 25 to 27 are illustrated in FIG. 2, any arbitrary number of sources and outputs may be present, depending on system requirements. In this case, the number of sources may also differ from the number of outputs.

It should be noted that the number of data sources and the number of data sinks, for example the number of sources 20 to 22 and the number of active outputs 25 to 27, may also be configurable, in particular may be configurable with regard to the run time, i.e. may be changed during operation. The data streams themselves may also vary, for example with regard to the number of data between synchronization markers. In exemplary embodiments, such variable data streams may be processed whilst maintaining synchronism.

Figure 3:
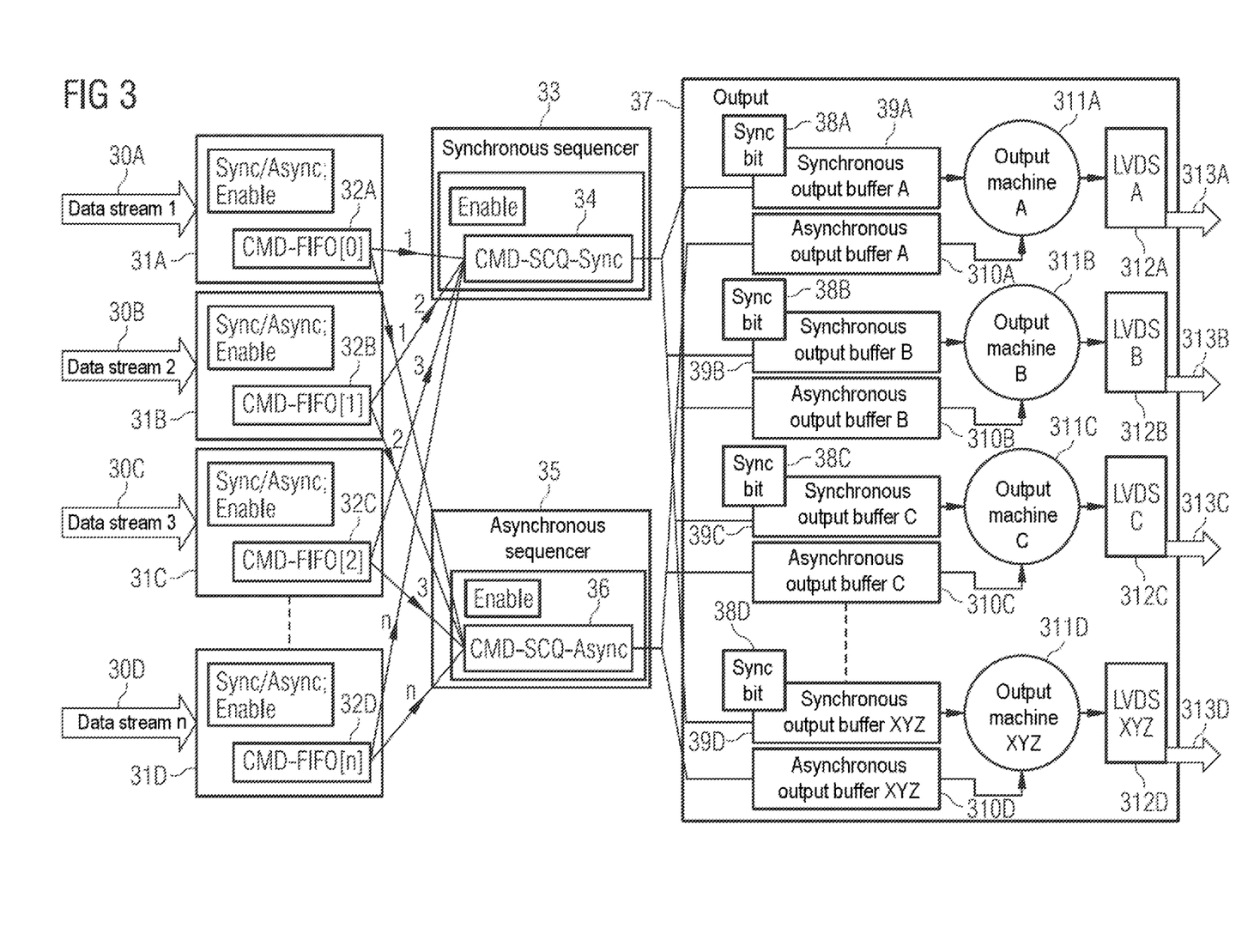
FIG. 3 shows a detailed illustration of a forwarding device in accordance with one exemplary embodiment.

FIG. 3 illustrates a more detailed example of a forwarding device according to the invention. The forwarding device in FIG. 3 may be implemented in particular as software, hardware, firmware or combinations thereof. In one preferred exemplary embodiment, the forwarding device in FIG. 3 is implemented wholly or partly in hardware, in particular in the form of a field programmable gate array (FPGA).

In the exemplary embodiment in FIG. 3, a plurality, in particular two or more, of input data streams 30A to 30B (hereinafter referred to collectively as input data streams 30) are fed to the forwarding device. The input data streams 30 may be generated in particular essentially as in the documents mentioned in the introduction, DE 10 2009 040839 A1 or DE 10 2008 009634 A1. The input data streams 30 may be read out for example from a ring memory (not illustrated), for example via a direct memory access (DMA). In the exemplary embodiments illustrated, the input data streams 30 are then stored in respectively assigned memories 31A to 31D, referred to collectively as memories 31, which comprise in particular FIFO devices 32A to 32D (First in-First out, i.e. memory in which data written first are read out again first). In some exemplary embodiments here, the data in the memories 31 may be identified as synchronous or asynchronous data—e.g. for each of the memories 31 as a whole and/or for the respective data in each memory separately. In some exemplary embodiments, therefore, each of the memories 31 contains either only synchronous data or only asynchronous data and is identified correspondingly. In other exemplary embodiments, the memories 31 may each contain synchronous and asynchronous data mixed, wherein the data are correspondingly identified. In still other exemplary embodiments, the memories 31 may each comprise separate FIFO devices for synchronous and asynchronous data. In this case, in particular a temporal relation of the data with respect to one another should be maintained for synchronous data, while this need not be the case for asynchronous data. The data of the input data streams 30 here may comprise data, in particular also commands, which are then to be forwarded to different devices.

The data from the memories 31 are then read out by a synchronous sequencer 33 and an asynchronous sequencer 35, wherein the synchronous sequencer 33 reads out synchronous data, while the asynchronous sequencer 35 reads out data which are asynchronous, i.e. data for which synchronism is not important and which may also be transmitted asynchronously with respect to one another. This reading out may be carried out directly e.g. via fixed hardware connections to each memory. The synchronous data are written e.g. via a buffer memory 34 (e.g. FIFO) of the synchronous sequencer 33 or else directly to synchronous output buffers 39A-39D explained further below, and the asynchronous data are written e.g. via a buffer memory 36 (for example FIFO) of the asynchronous sequencer 35 or else directly to asynchronous output buffers 310A-310D.

In the exemplary embodiment illustrated, the synchronous data streams are read out from the memories 31 in order here by the synchronous sequencer 33 and are passed to respective output data streams on the basis of synchronization markers. In this respect the output data streams for each output channel are then written to the corresponding synchronous output buffer 39A to 39D of an output device 37, wherein synchronization bits 38A to 38D can be introduced. In this case, the data themselves may define the output buffer 39A to 39D to which they are to be written. In the exemplary embodiment in FIG. 3, as an example four output channels are illustrated, which ultimately lead to four output data streams 313A to 313D. However, this number should once again be understood merely as an example, and essentially any arbitrary number of output data streams may be provided depending on system requirements and a desired implementation.

In the same way, the asynchronous sequencer 35 also divides the data read out from the memories 31A to 31D among the output data streams and writes them to corresponding asynchronous output buffers 310A to 310D. It should be noted that, in exemplary embodiments in which only synchronous data are to be handled, the asynchronous sequencer 35 and the asynchronous output buffers 310A to 310D can also be omitted.

In particular, the sequencers 33, 35 already sort the data from the individual input data streams and then write them to the respective appropriate output buffers 39A to 39D or 310A to 310D, if necessary whilst maintaining synchronism.

Each output channel is furthermore allocated, in the output device 37, an output machine 311A to 311D, which fills the synchronous data from the respective synchronous output buffer 39A to 39D with data from the respective asynchronous output buffer 310A to 310D (for example if there is still time for this in a time segment such as a clock cycle), in order to generate a respective output data stream. The output data streams are then output as output data streams 313A to 313D for example via output interfaces 312A to 312D. In this case, the output interfaces 312A to 312D may be in particular LVDS (low-voltage differential signaling) interfaces, wherein this merely serves as an example and other types of interfaces, amplifiers or output signals may also be used.

In this case, the abovementioned synchronization markers in the input data streams may serve, in particular, to process the latter synchronously with one another. In one exemplary embodiment, the synchronous sequencer 33 processes the synchronous data of the input data streams in order, by said synchronous sequencer removing a sufficient number of data from the respective input data stream until it finds a synchronization marker. Afterward, the next synchronous input data stream is read out in the same way from the next memory 31. Upon all the data streams having been run through, in some exemplary embodiments the synchronous sequencer 33 has read out and written to the synchronous output buffers 39A-39D all data which are to be transmitted in the output data streams 313A to 313D within a specific time segment, for example within a clock cycle. These data are then written to the respective synchronous output buffers 39A to 39D of the respective output channel via which the respective data are to be output (wherein data can also be output via a plurality of channels, for example if they are to be transmitted to a plurality of data sinks). This may also be referred to as bundling of the data. In the course of this bundling, care is taken to ensure that as far as possible all temporal conditions, in particular a desired synchronism, for a predefined time segment (for example clock cycle) are complied with and the data are present in the time segment envisaged (and are not shifted into a subsequent time segment). If there is still room within the respective time segment, afterward—as mentioned—asynchronous data are inserted by the respective output machine 311A to 311D, without generating a data overflow in the respective output channel (that is to say that the asynchronous data inserted do not amount to more than for example still fit in the respective time segment). It should be noted that the exemplary embodiment in FIG. 3 may also work if only asynchronous data are present. In this case, the synchronous sequencer 33 is inactive, and only the asynchronous sequencer is in operation.

This processing takes place at least partly in parallel for all the output channels as shown in the output device 37 in FIG. 3 in one preferred exemplary embodiment and in some exemplary embodiments is independent of the input data stream from which the data originate. In other exemplary embodiments, the data of different input data streams may have different priorities during the processing. In the example illustrated, partly in parallel means that e.g. in the output device 37 all devices which process or store the data (referred to generally as processing devices, e.g. 38-312), are provided separately for each output data stream and parallel processing of the data thus takes place in the output device 37. By contrast, the sequencers 33, 35 operate for all the data streams, such that no parallel processing takes place here, for which reason the processing is only partly in parallel in the example illustrated.

In other exemplary embodiments, the partly parallel processing may also be configured differently than the illustration shown in FIG. 3. By way of example, instead of separate memories 31 for each input data stream, fewer memories may also be provided, if appropriate even just one memory, wherein then a plurality of input data streams may jointly use one memory. On the other hand, it is also possible for one input data stream to be divided among a plurality of memories, such that the ratio of a number of input data streams to a number of assigned memories may be essentially arbitrary.

It is also possible to provide more than one synchronous sequencer 33 and/or more than one asynchronous sequencer 35, wherein then each sequencer reads only a portion of the memories 31. For completely parallel processing, it is also possible to provide a synchronous sequencer and an asynchronous sequencer for each input data stream.

Figure 4:
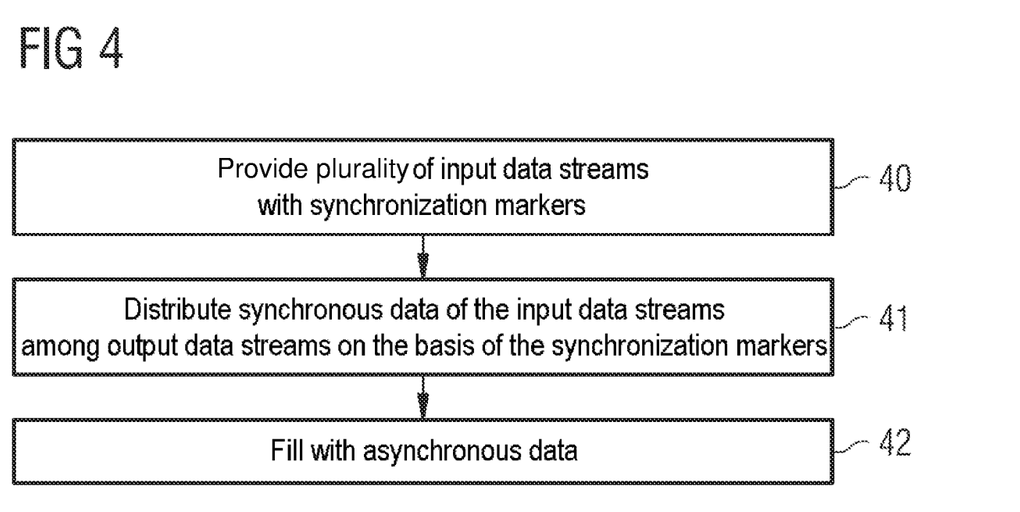
FIG. 4 shows a flow diagram for illustrating a method in accordance with one exemplary embodiment.

FIG. 4 shows a flow diagram of a method in accordance with one exemplary embodiment. The method in FIG. 4 may be implemented in particular on the basis of the above-discussed forwarding devices in FIGS. 1 to 3. Variations, modifications and details which were discussed for the exemplary embodiments in FIGS. 1 to 3 are also applicable to the method in FIG. 4, unless explained otherwise.

At 40 a plurality of input data streams with synchronization markers are provided. The plurality of input data streams may originate for example from a plurality of different sources, for example from different apparatuses of a microscope system.

At 41 synchronous data of the input data streams are distributed among a plurality of output data streams on the basis of the synchronization markers.

This may be carried out for example as explained with reference to FIG. 3. In this case, it is possible to ensure, in particular, that synchronous data occur in a plurality of output data streams in corresponding time segments, for example clock cycles. As a result, by way of example, devices which receive the output data streams can be controlled synchronously with one another.

Optionally, at 42 time segments which are not completely filled with synchronous data are filled with asynchronous data if the latter are likewise to be transmitted.

Figure 5:
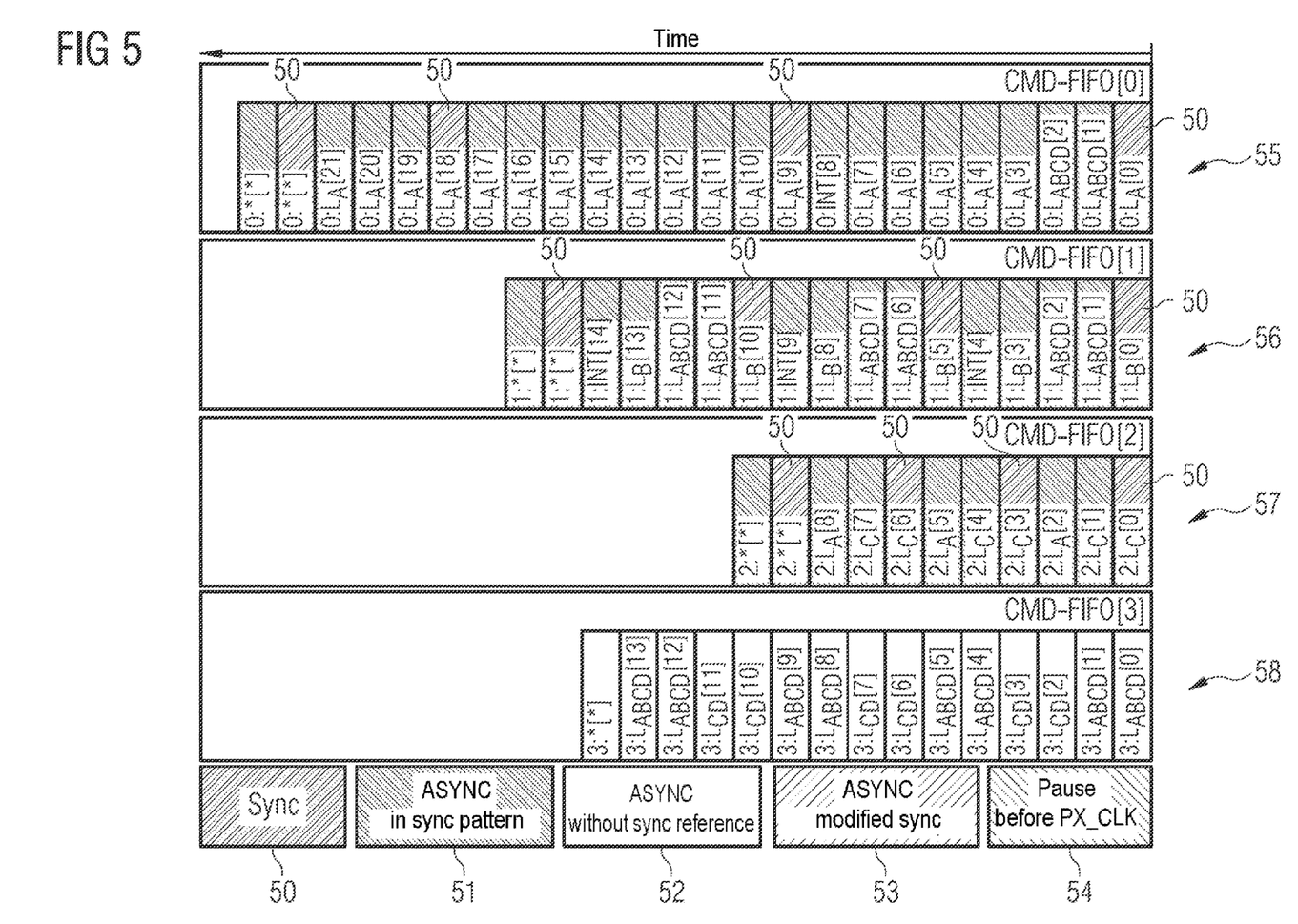
FIGS. 5 and 6 show examples of data streams for illustrating the functioning of exemplary embodiments.
Figure 6:
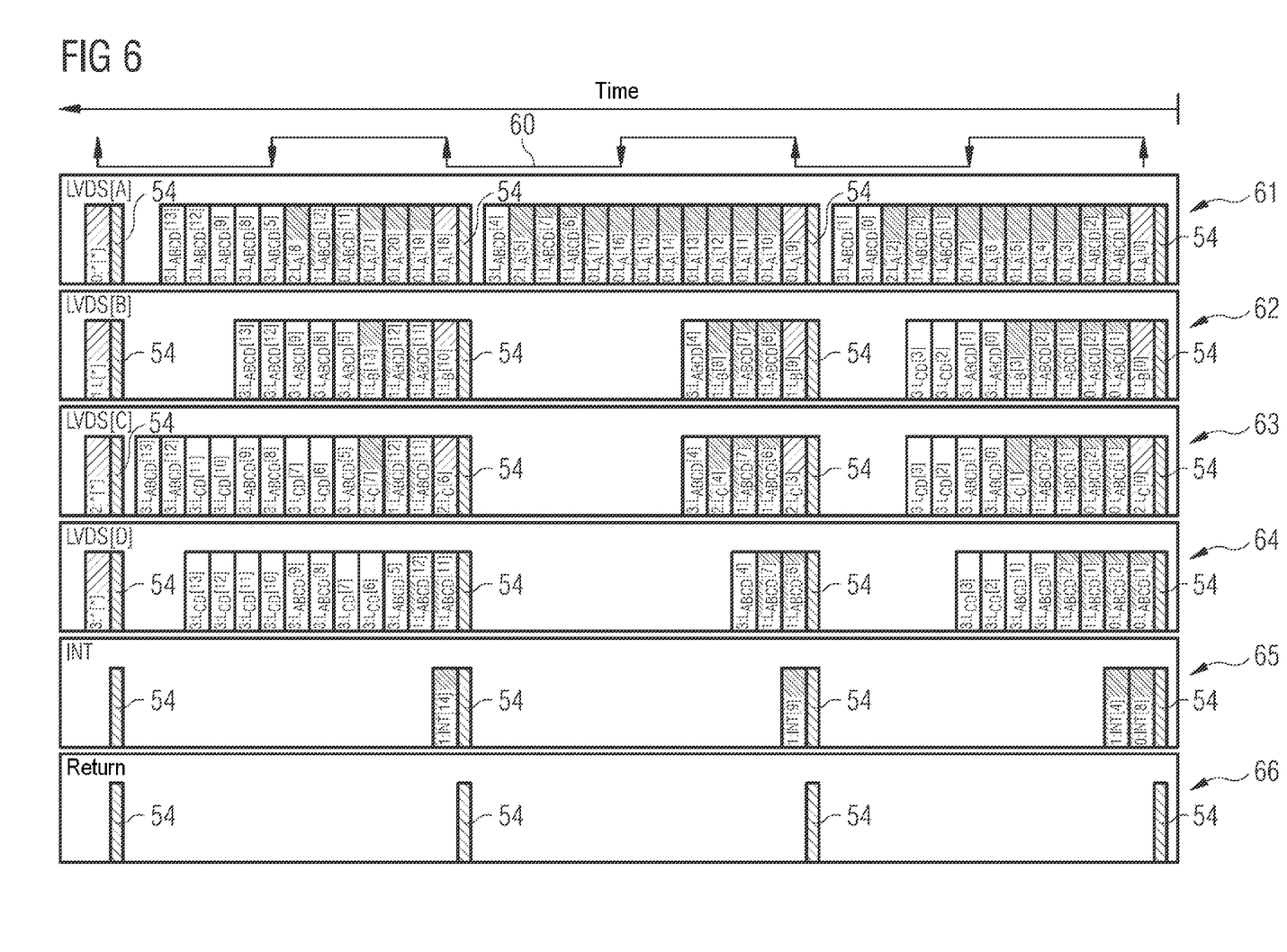

For further illustration of the above-discussed forwarding devices and methods, examples of data streams will now be explained with reference to FIGS. 5 and 6, wherein examples of input data streams are illustrated in FIG. 5 and examples of corresponding output data streams are illustrated in FIG. 6. It should be noted that these data streams, in particular the number of data streams, the number of data and the distribution thereof among the output data streams, serve merely for illustration and should not be interpreted as restrictive, since other values may also be present depending on the implementation.

In particular, four input data streams 55 to 58 are shown in the example in FIG. 5 and six output data streams 61 to 66, among which the data of the input data streams 55 to 58 are to be distributed, are illustrated in FIG. 6. FIG. 5 additionally shows a legend according to which different background representations identify a type of the individual data blocks (for example bits, bytes, words, data blocks, etc.) 50 to 54.

In this case, the data streams 55 to 57 are data streams having synchronous data in which data 50 bear synchronization markers (referred to hereinafter as synchronization markers 50 for the sake of simplicity). Such synchronization markers may be provided for example by setting a bit reserved therefor, by some other identification in the data or by additional data blocks between the other data blocks (payload data). The individual synchronization markers 50 are then followed by data in a pattern defined by the synchronization markers (sync pattern; designated by 51 in the legend), wherein for example data 51 that follow one synchronization marker 50 until a next synchronization marker 50 are to be transmitted in output data streams in a common clock cycle or other time segment.

The individual data in FIGS. 5 and 6 are identified by legends. In this case, the first digit indicates the number of the input data stream (0 for the input data stream 55, 1 for the input data stream 56, 2 for the input data stream 57 and 3 for the input data stream 58). This is followed by a colon. The colon is either followed by an L, which denotes a data type that is to be distributed among one or more of the data streams 61 to 64. The relevant data stream is indicated as an index after the L, wherein an A stands for the output data stream 61, a B stands for the output data stream 62, a C stands for the output data stream 63 and a D stands for the output data stream 64. If the colon is followed by an INT instead of an L, the data are to be distributed over the output data stream 65, which may constitute for example an internal command channel. In this exemplary embodiment, therefore, each data block comprises information regarding the output data stream to which it is to be assigned. In other exemplary embodiments, it is also possible for only some data blocks to comprise such information, which is then applicable e.g. to a plurality of successive data blocks. The output data stream 66 constitutes for example a return channel that can be used for detecting errors or for test purposes.

The input data stream 58 contains asynchronous data without a synchronization reference (52), which are not to be mapped synchronously into the output data streams.

In some data, finally, *[*] is indicated as a designation after the first digit. This indicates that as many further data and/or data streams as desired may also be provided, that is to say represents a "wildcard". Otherwise, between the square brackets there is the number of the datum (of the represented data block) in the respective data stream (for example from [0] to [21] for the input data stream 55, or from [0] to [14] for the input data stream 56).

For distributing the data of the input data streams 55 to 58 among the output data streams, by way of example, in one exemplary embodiment (as already explained with reference to FIG. 3), the data from the first synchronization marker 50 (i.e. firstly the respective data [0]) up to a datum before the respective second synchronization marker 50 are read from all the input data streams which are to be synchronized. These would be for example the data [0] to [8] for the first data stream 55, the data [0] to [4] for the second data stream 56, and the data [0] to [2] for the third data stream 57. In some exemplary embodiments, data are read from the fourth input data stream 58 by a separate sequencer (asynchronous), for example the asynchronous sequencer 35. The data are then distributed in accordance with their intended output data streams. The result is illustrated in FIG. 6. In this case, 60 shows a clock signal, and a cycle of the clock signal 60 represents an example of a time segment during which synchronous data are to be transmitted. Such a clock signal may be for example a so-called pixel clock signal of a microscope system. By way of example, in a laser scanner system, a pixel can be recorded during a period of the clock signal 60.

Each clock cycle (clock period) of the clock signal begins with a pause segment 54 in the output data streams 61 to 66. Subsequently, the synchronous data intended for the respective output data stream (i.e. the data from the data streams 55 to 57) are inserted, as is shown in FIG. 5. It is thus ensured that the data to be transmitted synchronously, as depicted by the synchronization markers 50, are transmitted in a clock period of the clock signal 60. In other exemplary embodiments, a relevant time segment may also comprise a plurality of clock periods of a clock signal or be determined differently.

Afterward, if there is space, asynchronous data are also added. In this case, in the exemplary embodiment explained with reference to FIGS. 5 and 6, care is taken to ensure that data of the data stream 58 which are assigned to a plurality of output channels are transmitted in an identical clock period in all the output data streams.

Thus, in the example illustrated, after the insertion of the synchronous data into the output data stream 61 two spaces (also referred to as time slots) are still free. The first two data which are to be inserted into the output data stream 61 are the data [0] and [1] of the asynchronous input data stream 58 (index "A"). Even more time slots are free in the case of the other output data streams 62, 63, 64. Therefore, the data [2] and [3] of the input data stream 58 can also be inserted here, which data are not to be inserted into the output data stream 61.

The datum [4] of the data stream 58 is once again to be inserted into the output data stream 61, but there is no more space for it here in the first clock period of the clock signal 60. Therefore, it is inserted only in the next clock period at the end. In order to transmit this datum [4] in parallel in all the assigned output data streams, it is inserted only in the next clock period in the other streams 62 to 64, too, even though there is still space here. If this synchronism is not important, in other exemplary embodiments the other output data streams 62 to 64 may also likewise be completely filled. By way of example, the datum [4] may then be inserted in the output data streams 62, 63 and 64 still in the first clock period of the clock signal 60.

This procedure is then repeated with the data from the respective second synchronization marker 50 in the input data streams up to the last datum before the third synchronization marker 50 (for example data [9] to [17] of the input data stream 55 and data [5] to [9] of the input data stream 59), wherein filling is subsequently carried out again with asynchronous data from the input data stream 58. This procedure is repeated until all the data have been transmitted, which leads to the result in FIG. 6.

It should be emphasized again that FIGS. 5 and 6 serve merely for further illustration and can also be applied to a different number of data on different numbers of input data streams and/or output data streams.

In the exemplary embodiments presented above, synchronization markers serve for the temporal synchronization of the data streams among one another. In some exemplary embodiments, the data streams may additionally be synchronized among one another and/or with external events with the aid of special commands. Such commands may be inserted into the data streams discussed. In this regard, what may be achieved by means of such commands is, for example, that one data stream (e.g. from the source 20 in FIG. 2) firstly waits and only starts when one or more other data streams (e.g. from the sources 21 and 22) have been processed up to a specific position. This may also be referred to as synchronization in terms of contents. A synchronization with external events is also possible; e.g. that a data stream or the processing thereof only starts when an external signal, e.g. an interrupt signal, is present.

Various advantages can be realized by means of the exemplary embodiments discussed. Some of these possible advantages are discussed below, where it may also be the case that only some of these advantages may be realized, depending on the exemplary embodiment.

The data streams may be influenced differently, both reciprocally and by external stipulations. In particular, for this purpose it is possible to use commands as discussed above in the data streams.

A low-latency synchronization of data streams may be achieved among one another on the basis of internal or external conditions, wherein the lower latency may be achieved in particular by virtue of the fact that large buffers are not necessary.

A number of the data streams may be variable, in particular also with regard to the run time, wherein the synchronism may be maintained. By way of example, in a channel output data stream for which no data are available, it is simply not possible to transmit any data (which is then manifested for example as in the case of output data stream 66), and as soon as data are available, they can be correctly synchronized.

As already mentioned, the number of data streams may be varied; this may mean in particular a configurable distribution of a configurable number of input data streams among a configurable number of data sinks (output data streams).

In this case, the data distribution and data processing may react dynamically and with low latency to various events in the system and externally.

As explained in particular with reference to FIGS. 5 and 6, asynchronous data stream outputting may be carried out simultaneously with synchronous data outputting, which minimizes the latency of the asynchronous data, without the synchronous data outputting being influenced temporally.

In exemplary embodiments, prior calculation of the data streams and the dependencies thereof for example by software is not necessary since for example the data themselves contain the necessary information for allocation to output data streams.

The techniques presented may be implemented well in hardware, for example in an FPGA. Real-time-critical software implementations may be avoided as a result.

The exemplary embodiments discussed serve merely for illustration and should not be interpreted as restrictive.

The invention claimed is:

1. A method for forwarding data, comprising:
   receiving a plurality of input data streams, wherein at least some of the input data streams comprise synchronization markers indicating which data of the input data streams are to be output synchronously, in one or more common time segments, and
   distributing the data to be output synchronously among a plurality of output data streams on the basis of the synchronization markers;
   wherein distributing is carried out in such a way that data which, according to the synchronization markers, are to be transmitted in a common time segment are provided in the same time segment in all the output data streams to which said data are to be assigned;
   wherein the method includes progressively reading out the plurality of input data streams, wherein data assigned to a synchronization marker are read out in each case from each input data stream, and distributing the data thus read out among the output data streams; and
   wherein the progressive reading out and the distributing are then repeated in each case for a respective next synchronization marker of the input data streams.

2. The method as claimed in claim 1, wherein receiving the input data streams comprises storing the input data streams in a respectively assigned memory.

3. The method as claimed in claim 1, wherein the progressive reading out is carried out in parallel for different groups of input data streams.

4. The method as claimed in claim 1, further comprising filling time segments of the output data streams with data that are not to be transmitted synchronously.

5. The method as claimed in claim 4, wherein the filling is carried out in parallel for all the output data streams.

6. The method as claimed in claim 4, wherein the filling is carried out in such a way that data of the input data streams which are to be provided in a plurality of output data streams are provided in mutually corresponding time segments in the output data streams.

7. The method as claimed in claim 1, wherein a data processing is carried out at least partly in parallel for the plurality of output data streams.

8. The method as claimed in claim 1, wherein the data are data of a microscope system.

9. The method as claimed in claim 1, wherein the data comprise commands for at least one of:
   synchronizing the input data streams among one another;
   synchronizing the output data streams among one another; and
   synchronizing the output data streams with external events.

10. The method as claimed in claim 1, wherein the data of the input data streams have information regarding to which output data stream of the output data streams they are to be assigned.

11. A data forwarding device, comprising:
    input circuitry including one or more memory circuits configured to receive a plurality of input data streams;
    output circuitry configured to provide output data streams corresponding to the input data streams; and
    processing circuitry configured to obtain the output data streams from the input data streams, wherein at least some of the input data streams comprise synchronization markers indicating which data of the input data streams are to be output synchronously, in one or more common time segments, and wherein the processing circuitry is configured to distribute the data to be output synchronously among a plurality of output data streams on the basis of the synchronization markers;
    wherein the distributing is carried out in such a way that data which, according to the synchronization markers, are to be transmitted in a common time segment are provided in the same time segment in all the output data streams to which said data are to be assigned;
    wherein the one or more memory circuits comprises a plurality of memories, each configured for storing data of one of the input data streams; and
    wherein the processing circuitry is configured to progressively read out data assigned to a given one of the synchronization marker from the input circuitry, wherein the output circuitry includes an output buffer for each of output data stream outputs, and wherein the processing circuitry is configured to write the read data to corresponding ones of the output buffers.

12. The data forwarding device as claimed in claim 11, wherein the processing circuitry is configured to read out data from the input circuitry that are not to be transmitted synchronously, and to write said data to further output buffers of the output circuitry, and wherein the processing circuitry is configured form each output data stream as a combination of synchronous data from a corresponding one or more input data streams and non-synchronous data from the corresponding one or more input data streams.

13. The data forwarding device as claimed claim 11, wherein the forwarding device comprises at least one of an application-specific integrated circuit and a field programmable gate array.

* * * * *

UNITED STATES PATENT AND TRADEMARK OFFICE
CERTIFICATE OF CORRECTION

PATENT NO. : 10,579,576 B2  
APPLICATION NO. : 15/529890  
DATED : March 3, 2020  
INVENTOR(S) : A. Kuehm et al.

Page 1 of 1

It is certified that error appears in the above-identified patent and that said Letters Patent is hereby corrected as shown below:

In the Claims

Column 12, Line 64 (Claim 12, Line 6), please insert --to-- between "Configured" and "form"

Signed and Sealed this  
Eighth Day of December, 2020

Andrei Iancu  
*Director of the United States Patent and Trademark Office*